United States Patent [19]

Baker et al.

[11] 4,174,098
[45] Nov. 13, 1979

[54] SHOCK ABSORBER AND MOUNTING MEANS THEREFOR

[75] Inventors: Ralph C. Baker, Northville; Larry E. Ellis, Farmington; Francis M. Simpson, Jr., Livonia, all of Mich.

[73] Assignee: ACE Controls, Inc., Farmington, Mich.

[21] Appl. No.: 921,589

[22] Filed: Jul. 3, 1978

[51] Int. Cl.² .................. F16F 9/19; F16F 9/34; F16F 9/44
[52] U.S. Cl. .................. 267/8 R; 188/285; 188/287; 188/315; 267/130
[58] Field of Search .................. 188/285, 287, 318; 267/8 R, 130, 137, 167; 213/8, 43; 16/51, 52, 66

[56] References Cited

U.S. PATENT DOCUMENTS

| | | | |
|---|---|---|---|
| 1,313,763 | 8/1919 | Thomas | 188/287 |
| 1,870,827 | 8/1932 | Arnold | 188/287 |
| 2,846,029 | 8/1958 | Cawley | 188/287 |
| 3,059,268 | 10/1962 | McHale | 16/62 |
| 3,168,168 | 2/1965 | Chorkey | 188/287 |
| 3,344,894 | 10/1967 | Kenworthy | 188/287 |
| 3,510,117 | 5/1970 | Scholin et al. | 267/126 |
| 3,554,528 | 1/1971 | Kring et al. | 267/126 |
| 3,598,206 | 8/1971 | Hennells | 188/287 |
| 3,605,960 | 9/1971 | Singer | 188/287 |
| 3,645,365 | 2/1972 | Domeck | 188/285 |
| 3,693,767 | 9/1972 | Johnson | 188/285 |
| 3,731,770 | 5/1973 | Bindon | 188/285 |
| 3,750,856 | 8/1973 | Kenworthy | 188/287 |
| 3,782,710 | 1/1974 | Selke et al. | 267/118 |
| 3,797,615 | 3/1974 | Stembridge | 188/285 |
| 3,840,097 | 10/1974 | Holley | 188/287 |
| 3,998,302 | 12/1976 | Schopner | 188/285 |
| 4,059,175 | 11/1977 | Dressel, Jr. et al. | 188/285 |
| 4,071,122 | 1/1978 | Schupner | 188/285 |

*Primary Examiner*—George E. A. Halvosa
*Attorney, Agent, or Firm*—Robert G. Mentag

[57] ABSTRACT

A hydraulic shock absorber having an outer tube which is closed at one end and open at the other end. An inner tube, having a plurality of metering orifices, and having a closed inner end and an open end, is mounted in the outer tube with its closed end against the closed end of the outer tube. A meter tube, having a plurality of metering openings, is rotatably mounted above the inner tube. The inner tube is retained in its longitudinal operative position by the meter tube, a rotatable retainer member, and a wave washer. A locking pin retains the inner tube against rotation. The inner tube, meter tube, and the rotatable retainer member are all assembled into the outer tube through the open end of the outer tube, and they are retained in the outer tube by a retainer member. A meter tube adjusting ring is rotatably mounted on the outer tube, and it is connected to the meter tube for adjusting the position of the metering holes in the meter tube relative to the metering orifices in the inner tube. The ends of the shock absorber are threaded for operative mounting in a threaded mounting flange which is adapted to be secured to a machine or other support member. A locking collar is threadably mounted on the adjacent threaded end of the shock absorber and locked against the mounting flange.

14 Claims, 8 Drawing Figures

SHOCK ABSORBER AND MOUNTING MEANS THEREFOR

BACKGROUND OF THE INVENTION

1. Field of the Invention

This invention relates generally to the hydraulic shock absorber art, and more particularly to an improved hydraulic shock absorber which is adapted for various uses, as for example, is automotive, industrial machines and other similar applications, and which is capable of being adjusted to provide controlled, linear deceleration of loads.

2. Description of the Prior Art

The prior art hydraulic shock absorbers generally include an inner pressure chamber which is filled with fluid, and in which is slidably mounted a piston that is connected to a piston rod which is adapted to receive impact forces. The inner pressure tube of the prior art shock absorbers is provided with metering orifices through which fluid is forced when the piston rod receives an impact load. The prior art shock absorbers are provided with meter tube means for regulating the opening of the metering orifices. However, such prior art shock absorber constructions have a disadvantage in that they are not as efficient as might be desired, and there is leakage or slippage between the inner pressure tube and the meter tube means for regulating the opening of the metering orifices. Another disadvantage of the prior art hydraulic shock absorbers is that the meter tube means for adjusting the opening of the metering orifice does not provide a fine adjustment means, nor does it provide a sharp edge means for controlling the opening of the orifices. Still another disadvantage of the prior art hydraulic shock absorbers is that they are complex, costly to manufacture, and include many parts which make them uneconomical to repair.

Heretofore, hydraulic shock absorbers were secured in an operative position on a machine or other mounting member by various types of mounting structures. One prior art mounting shock absorber structure comprises a mounting collar having a transverse cut to form split ends, and which is secured to the machine and receives a threaded end of a shock absorber, and the split ends of the collar are then moved together by suitable screw means so as to jam the ends of the split collar onto the thread of the outer periphery of the shock absorber. A disadvantage of such prior art shock absorber mounting means is that when the split collar is forced down onto the thread on the shock absorber, said thread is meshed and damaged, and during use the shock absorber vibrates loose. Other prior art shock absorber mounting collars employ a longitudinal split or cut, whereby when the split portions of the locking collar are drawn together to jam the collar on the shock absorber, the threads on the shock absorber are wedged together and damaged.

SUMMARY OF THE INVENTION

The hydraulic shock absorber of the present invention comprises a cylindrical outer tube in which is mounted a smaller diameter inner tube. The rear end of the outer tube is enclosed. The front end of the outer tube is enclosed by a detachable, rotatable bearing and seal retainer member. The inner tube is disposed in a spaced apart position relative to the outer tube to form an accumulator chamber between the inner tube and the outer tube.

A piston assembly is slidably mounted in a piston cylinder formed in the inner tube, and it carries an impact receiving head or button. A return stroke spring is provided for returning the piston assembly to its initial position after each impact receiving operation. The inner tube is provided with a plurality of exponentially disposed round metering holes or orifices which communicate the piston cylinder in the inner tube with the accumulator chamber. A foam rubber means is mounted in the accumulator chamber. The flow of fluid through the metering orifices during an impact receiving operation, when the piston assembly is moved inwardly in the piston cylinder, is controlled by a metering orifice regulating means.

The metering orifice regulating means comprises a meter tube which is rotatably mounted about the inner tube in a close fitting relationship to prevent leakage between the meter tube and the inner tube. The inner tube is connected to the rotatable bearing and seal retainer member which, in turn, is connected by an adjusting ring screw to an external adjusting ring which is rotatably mounted on the outer surface of the outer tube. The adjusting ring screw extends through a peripheral slot formed through the outer tube to permit the bearing and seal retainer member to be rotated when the adjusting ring is rotated, and thereby rotate the meter tube. The meter tube is provided with a plurality of longitudinally spaced apart angled slots which extend about the periphery of the metering tube, and which are angled from a diametrical transverse plane through the metering tube. The metering slots may also be helically disposed. The metering slots are exponentially and longitudinally spaced apart, with each of the slots being adapted to control the flow of fluid through one of the metering orifices. As the meter tube is rotated, the angled slots proportionally block off the fixed area metering holes or orifices in the inner tube. A lock means is provided for locking the adjusting ring in an adjusted position. The inner tube is held in its axial operative position by the meter tube, the rotatable bearing, and seal retainer and a wave washer.

The hydraulic shock absorber mounting means of the present invention comprises a mounting flange having a rectangular body through which is formed a plurality of bolt holes for mounting the flange on a machine or other mounting member by a plurality of suitable machine screws. An axial threaded hole is formed through the mounting flange for receiving a threaded end of a shock absorber. A locking collar is threadably mounted on the threaded end of a shock absorber, and it is threaded into jamming engagement with one face of the mounting flange so as to securely lock the shock absorber in an operative position without damaging the threads of the shock absorber.

Other objects, features and advantages of this invention will be apparent from the following detailed description, appended claims, and the accompanying drawings.

DESCRIPTION OF THE PREFERRED EMBODIMENT

Figure 1:
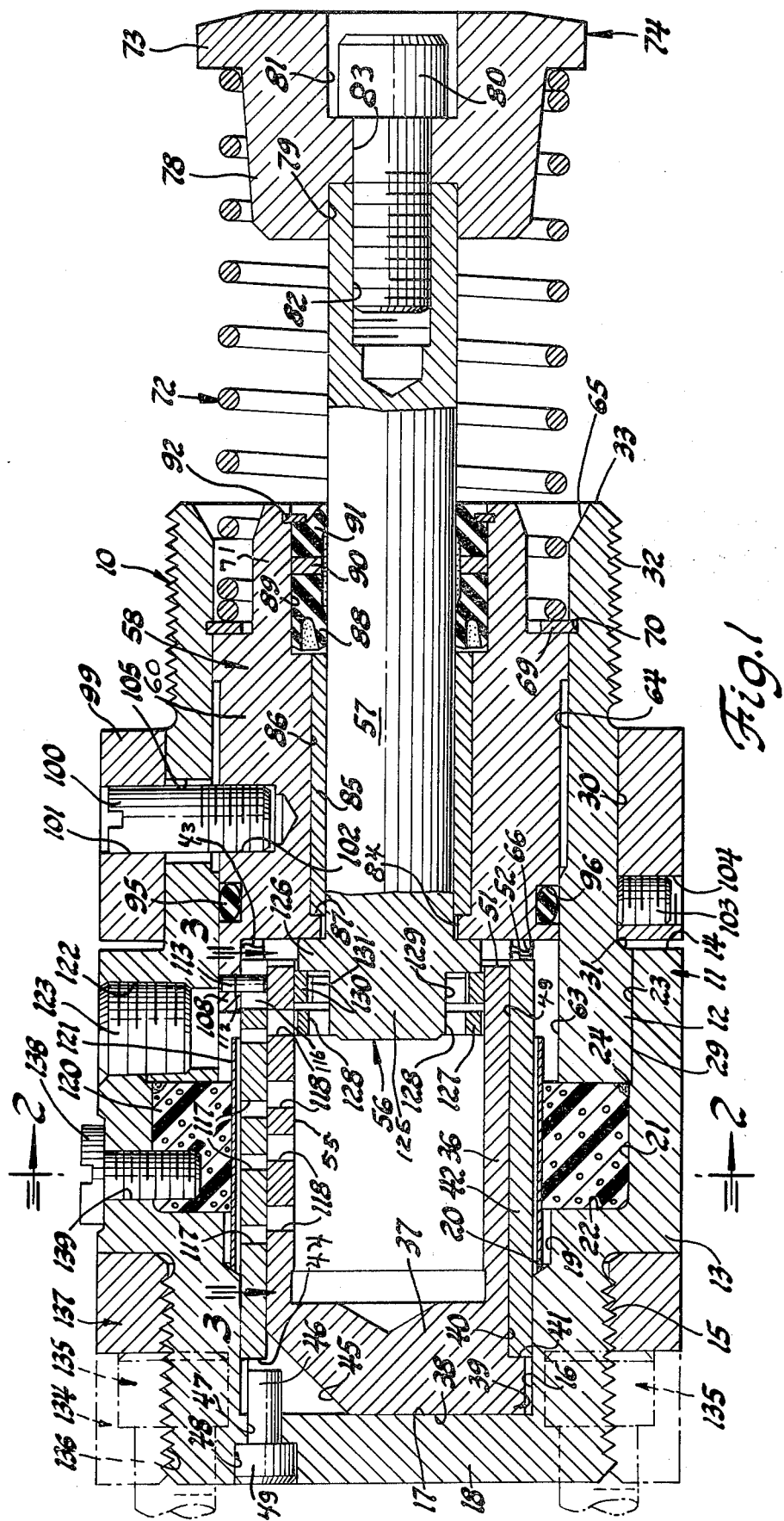
FIG. 1 is a longitudinal section view of a shock absorber made in accordance with the principles of the present invention.

Referring now to the drawings, and in particular to FIG. 1, the numeral 10 generally designates a shock absorber made in accordance with the principles of the present invention. The shock absorber 10 includes an outer cylindrical tube or body, generally indicated by the numeral 11, which includes a front end portion 12 that is slidably mounted in a larger diameter rear portion 13. The cylindrical parts 12 and 13 of the outer tube 11 are fixed together by any suitable means, as by being brazed together. The numeral 14 designates the front end of the outer tube rear portion 13. The rear end of the outer tube rear portion 13 is provided with an outer reduced diameter periphery on which is formed a peripheral mounting thread 15.

As shown in FIG. 1, the outer tube rear part 13 is provided with a stepped inner bore, with the rear end portion being of the smallest diameter, as indicated by the numeral 16. Said outer tube stepped bore portion 16 is enclosed at the rear end thereof by an integral transverse end wall 18 which has an inner transverse face 17. Said outer tube stepped bore further includes a portion 19 which is of a larger diameter than the bore portion 16 and which is connected thereto by the sloping bore portion 20. Said outer tube stepped bore further includes larger diameter portion 21 which mates with the bore portion 19 by means of the transverse annular wall or shoulder 22 at the rear end thereof. Said outer tube stepped bore further includes the largest diameter portion 23 in the front open end of the tube part 13 which forms a shoulder 24 at the junction with the bore portion 21. The outer tube front portion 12 has a rear end portion with an outer diameter indicated by the numeral 29 which is slidably mounted in the outer tube rear portion bore 23 against the shoulder 24. The outer tube front end part 12 has a reduced diameter front end portion 30 which is threaded on the front half length thereof with an external thread 32 for mounting the shock absorber 10 in an operative position on a machine, or in any other desired working location. The numeral 33 in FIG. 1 designates the transverse front end of the outer tube front portion 12.

An inner tube 36 is fixedly mounted in the outer tube 11 in a telescopic, spaced apart relationship. The inner tube 36 is enclosed at the rear end thereof by a suitable transverse end wall 37 which has its outer transverse surface 38 seated against the inner face 17 of the outer end wall 18. The inner tube end wall 37 is provided with an annular flange 39, around the rear end thereof so as to form a shoulder 41 with the outer cylindrical periphery 40 of the inner tube 36. A metering tube, generally indicated by the numeral 42, is rotatably mounted about the periphery 40 of the inner tube 36 with its inner bore 49 in sliding seating engagement with said periphery 40 and with its rear end 44 rotatably seated on the shoulder 41. The metering tube 42 is biased into seating engagement on the shoulder 41 by a suitable wave spring washer 43 which abuts the front end 52 of the metering tube 42 and the rear face 66 of the bearing and seal retainer assembly, generally indicated by the numeral 58.

As shown in FIG. 1, the inner tube rear end wall 37 is provided with an angular slot 45 in the rear periphery thereof for the reception of the inner end of an inner tube lock pin 46. The inner tube lock pin 46 is provided with an annular head 49 which is seated in a bore 48 in the outer tube rear end wall 18. The cylindrical body of the lock pin 46 extends inwardly through a reduced diameter bore 47 in the outer tube end wall 18 and thence into the slot 45. The front end of the inner tube 36 is designated by the numeral 51 in FIG. 1, and it is spaced apart from the inner end 66 of the bearing and seal assembly 58.

As shown in FIG. 1, the cylindrical chamber 55 in the inner tube 36 forms a piston cylinder in which is slidably mounted from the open end thereof, a piston, generally indicated by the numeral 56. A piston rod 57 is integrally attached to the piston 56, and it is slidably supported in the bearing and seal assembly member 58.

Figure 4:
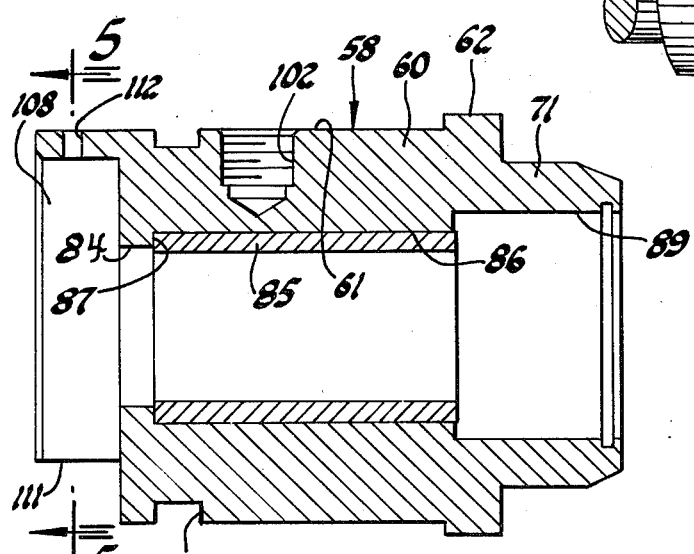
FIG. 4 is a longitudinal section view of a bearing and sealing retainer member employed in the shock absorber illustrated in FIG. 1.

As shown in detail in FIG. 4, the bearing and seal assembly 58 includes the cylindrical body 60 which has an outer diameter 61 over the majority of its length, and which has an enlarged outer diameter portion 62 near its front end. The rear end of the outer diameter portion 61 of the bearing and seal assembly body 60 is slidably mounted in the inner stepped bore portion 63 of the outer tube front end portion 12. The enlarged diameter peripheral portion 62 of the bearing and seal assembly body 60 is slidably mounted in the enlarged diameter bore portion 64 of the stepped bore in the outer tube front part 12. The front end of the outer stepped bore portion 64 terminates in a tapered bore portion 65 that extends to the front end 33 of the outer tube part 12.

As shown in FIG. 1, the rear end 66 of the bearing and seal assembly body 60 is longitudinally spaced apart from the front ends 51 and 52 of the inner tube 36 and the metering tube 42, respectively, to form a fluid passage therebetween which communicates at its outer end with the stepped bore portion 63 in the outer tube front end part 12.

As shown in FIG. 1, the bearing and seal assembly 58 is retained in the outer tube front end part 12 by a suitable retaining ring 69 which is seated in an annular groove 50 formed in the periphery of the bore portion 64 in the outer tube part 12. The body 60 of the bearing and seal assembly 58 includes a reduced diameter front end portion 71 which extends forwardly beyond the retaining ring 69 and around which is operatively mounted, in telescopic relationship, the inner end of a piston return spring 72. The rear end of the return spring 72 is seated on the outer face of the retaining ring 69 and the front end of the spring 72 is seated against the inner side of a radial flange 73 that is formed on the outer end of an impact receiving button or head, generally indicated by the numeral 74. The button 74 is provided with a cylindrical body portion 78 which is integral with the radial flange 73 and which has formed in the inner end thereof an axial bore 79 in which is slidably received the piston rod 57. The outer end of the piston rod 57 is provided with a threaded bore 82 which communicates with a stepped screw bore, indicated by the numerals 81 and 83. A suitable machine screw 80 is mounted through the stepped bore portions 81 and 83, and it is threadably mounted in the bore 82 in the outer end of the piston rod 57.

As shown in FIG. 4, the bearing and seal assembly 58 is provided with a stepped axial bore comprising the portions 84, 86 and 89. A suitable sleeve bearing 85 is mounted in the central bore portion 86, and its inner end is seated against a shoulder 87 that is formed by the junction of the bore portions 84 and 85.

As shown in FIG. 1, a suitable rod and wiper assembly is mounted in the stepped bore portion 89 in the bearing and seal assembly 58, and it includes a cup shaped annular seal member 88 and a wiper 91. A spacer ring 90 is disposed between the seal 88 and a wiper member 91. The retaining ring 92 is operatively mounted in a suitable groove in the wall of the bore portion 89 for retaining the combination seal and wiper assembly in place. As shown in FIG. 1, the bearing and seal assembly body 60 is provided with a suitable O-ring seal 95 around its inner end thereof, which is mounted in a peripheral groove 96.

As shown in FIG. 1, an adjusting ring 99 is rotatably mounted about the reduced outer diameter portion 30 of the outer tube front end part 12, and it is releasably secured to the bearing and seal assembly body 60 by a suitable elongated adjusting ring screw 100. The screw 100 extends through a radial bore 101 formed through the adjusting ring 99 and through a peripheral slot 105 formed through the wall of the outer tube front end part 12 and into threaded engagement with a threaded bore 102 formed in the bearing and seal assembly body 60. The outer end portion of the screw 100 which is seated in the bore 101 in the adjusting ring 99 is provided with a smooth surface for sliding rotation in the bore 101 in the adjusting ring 99. It will be seen that when the adjusting ring 99 is rotated about the outer tube 11, the seal and bearing assembly 58 will be rotated within the outer tube 11, as more fully described hereinafter. As shown in FIG. 1, the adjusting ring 99 is adapted to be fixed in an adjusted position by a set screw 103 which is threadably mounted in a radial bore 104 in the adjusting ring 99, so that its inner end can be moved into a gripping engagement with the outer periphery 30 of the outer tube front part 12.

Figure 3:
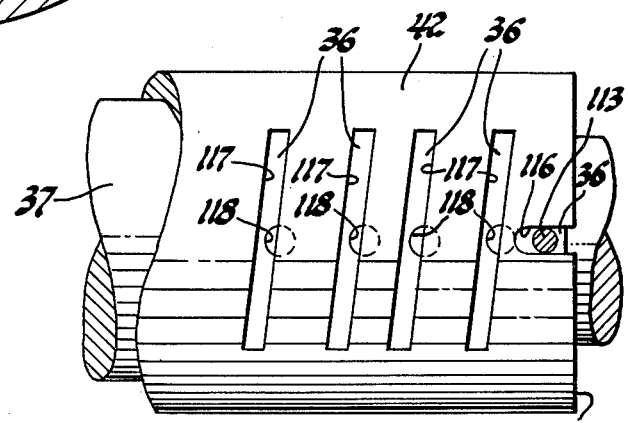
FIG. 3 is a fragmentary, horizontal section view of the shock absorber structure illustrated in FIG. 1, taken along the line 3—3 thereof, looking in the direction of the arrows, and showing the metering means employed in the invention.
Figure 5:
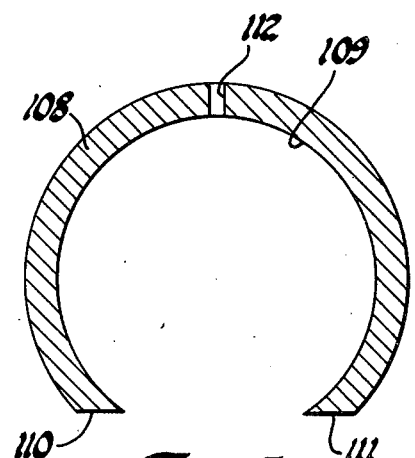
FIG. 5 is an elevation section view of the structure illustrated in FIG. 4, taken along the line 5—5 thereof, and looking in the direction of the arrows.

As shown in FIGS. 4 and 5, the seal and bearing assembly body 60 is provided on its inner end with an arcuate longitudinally extended portion 108 in which is formed a cylindrical recess 109. As shown in FIG. 5, the lower end of the extension 108 is open, and the spaced apart ends thereof are indicated by the numerals 110 and 111. A radial bore 112 is formed through the wall of the extension member 108, and it communicates with the cylindrical recess or chamber 109. As shown in FIG. 1, a drive or connection pin 113 is mounted in the bore 112 and is secured therein by any suitable means, as by a press fit. As shown in FIGS. 1 and 3, the drive pin 113 extends inwardly into sliding engagement in a longitudinal slot 116 which is formed through the wall of the rotatable metering tube 42. FIG. 3 shows the slot 116 as extending inwardly from the front end 52 of the metering tube 42 and toward the rear end of the metering tube 42.

As best seen in FIG. 3, the metering tube 42 is provided with a plurality of longitudinally spaced apart, parallel, transverse angled metering slots 117 which are adapted to be moved over the metering holes or orifices 118 which are formed through the inner tube 36. Each metering slot 117 is adapted to coact with a separate metering orifice 118 and to be moved across its respective orifice 118 for controlling the outward metering flow of hydraulic fluid from the piston cylinder 55 during an inward shock absorbing movement of the piston 56.

It will be understood that the metering holes or orifices 118 may be disposed in a line, as shown in FIG. 3, or that they may be spaced spirally around the inner tube 36 with their metering slots 117 also spirally disposed about the metering tube 42. The elongated, transverse angled slots 117 provide an efficient metering of hydraulic fluid through the orifices 118, and provide what may be termed sharp edged orificing. It will also be understood, that each slot 117 could control the flow of fluid through more than one hole 118, if desired. It will be seen that because of the angled disposition of the slots 117, that as the adjusting ring 99 is rotated, the adjusting screw 100 will move peripherally through the slot 105, and the slots 117 may be moved from the fully opened position to a fully closed position as the metering tube 42 is rotated about the inner tube 36. The widths of the metering slots 117 are shown as being less than the diameter of the holes 118, but it will be understood that these dimensions may be varied, as desired. That is, the slots widths could be enlarged to make them the same size as the diameters of the holes 118.

Figure 2:
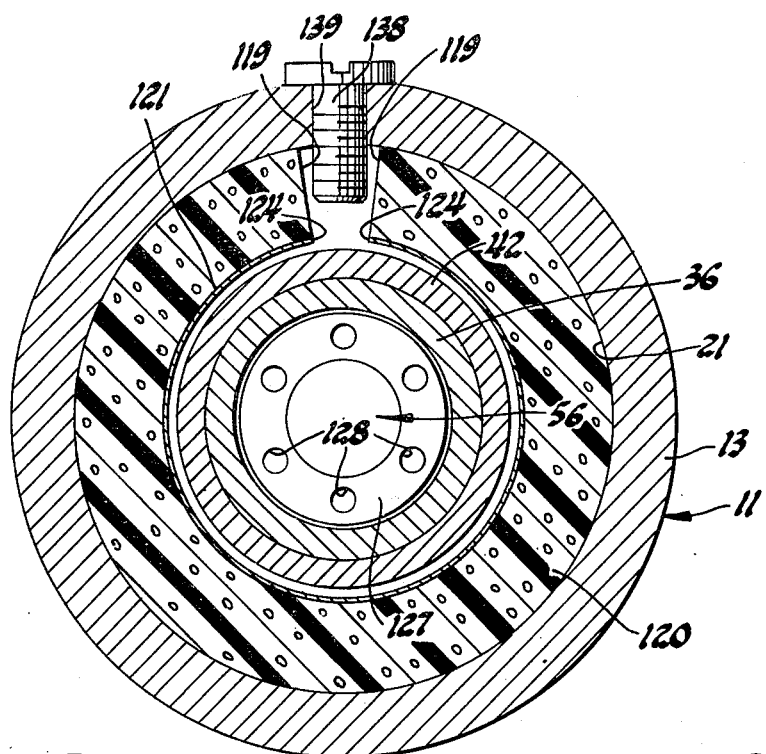
FIG. 2 is an elevation section view of the shock absorber structure illustrated in FIG. 1, taken along the line 2—2 thereof, and looking in the direction of the arrows.

As shown in FIGS. 1 and 2, a foam rubber or sponge accumulator strip 120 is disposed in the outer tube bore 21 in the outer tube rear part 13, and it is seated between the bore shoulder 22 and the rear end of the outer tube front part 12. As shown in FIG. 2, numeral 119 indicates the ends of the foam rubber 120. FIG. 2 also shows the foam rubber 120 to be covered along its inner periphery by a metal deflector 121 which is cylindrical in shape, with the ends 124 terminating in alignment with the ends 119 of the foam rubber 120. The metal deflector plate 121 functions to keep high velocity jet streams of hydraulic fluid passing from the slots 117 into the outer tube 11 from hitting the foam rubber 120. The space or chamber between the outer periphery of the metering tube 42 and the inner surface of the outer tube formed by the stepped bores 19, 21 and 63 comprise an accumulator chamber in which the foam rubber 120 is mounted. The outer tube rear part 13 is provided with a threaded bore 122 for filling the shock absorbers with a suitable hydraulic fluid, and this bore is enclosed by a plug 123.

As shown in FIG. 1, the body 125 of the piston 56 is provided with a peripheral slot 129 so as to form a pair of longitudinally spaced apart flange members 126 and 127 between which is movably mounted a suitable floating piston ring 130. The piston ring 130 is provided with a metal back-up ring 131 which functions to seal the gap in the piston ring 130. The piston ring 130 functions as a piston ring check valve. The flange 127 on the inner end of the piston body 125 is provided with a plurality of axial holes 128 (FIGS. 1 and 2) which communicate with the peripheral slot 129. As shown in FIG. 1, the outer diameter of the piston flange 126 is slightly smaller than the diameter of the piston cylinder or chamber 55 to permit a flow of fluid through the slot 129 and by the flange 126 into the transverse passageway between the ends 51 and 52 of the inner tube 36 and metering tube 42, respectively, and the end 66 of the seal and bearing assembly 58 to permit communication with the accumulator chamber formed by the bores 19, 21 and 63 in the outer tube 11.

Figure 6:
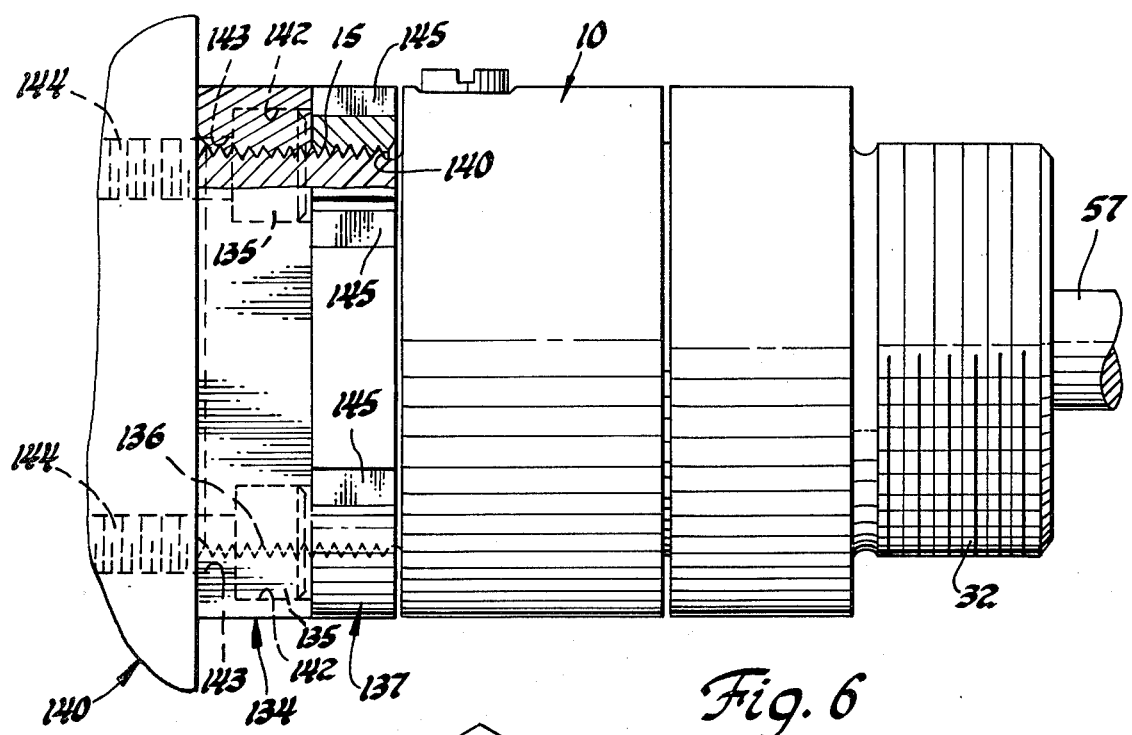
FIG. 6 is a side elevation view of the shock absorber mounting means of the present invention supporting a shock absorber.
Figure 7:
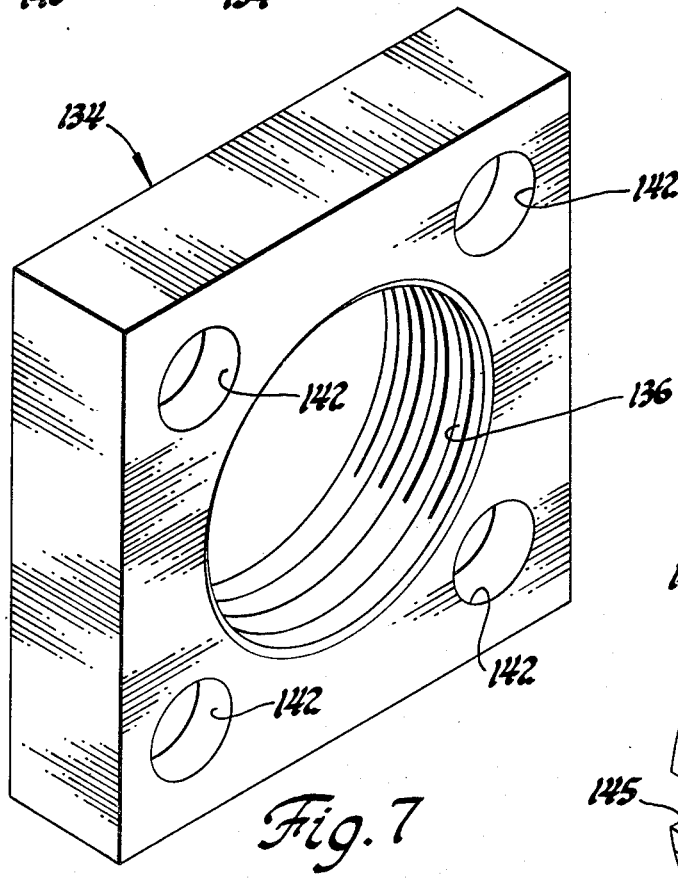
FIG. 7 is an elevational perspective view of a mounting flange employed in the structure of FIG. 6.

FIG. 6 shows the structure employed in securing the shock absorber 10 in a suitable working position on a machine 140. The numeral 134 generally indicates a mounting flange which is adapted to be attached by a plurality of suitable machine screws, as machine screws 135, to a machine or other structure on which it is to be mounted. The flange 134 comprises a rectangular block. The machine screws 135 are adapted to have their heads seated in enlarged holes 142 formed through the flange 134, and their threaded shafts extended through the reduced diameter holes 143 in the flange 134, and into threaded engagement with the threaded holes 143 in the machine 140. The threaded end 15 on the outer tube rear part 13 of the shock absorber is threadably mounted in the internal threaded bore 136 in the flange 134. A locking collar, generally indicated by the numeral 137, is threadably mounted on the threaded end 15 of the shock absorber outer tube rear part 13, and it is adapted to be jammed against the adjacent face of the mounting flange 134 for locking the shock absorber 10 in place. The locking collar 137 is provided with a threaded bore 141 (FIG. 8) for mounting the collar on the threaded end 15 of the shock absorber 10.

Figure 8:
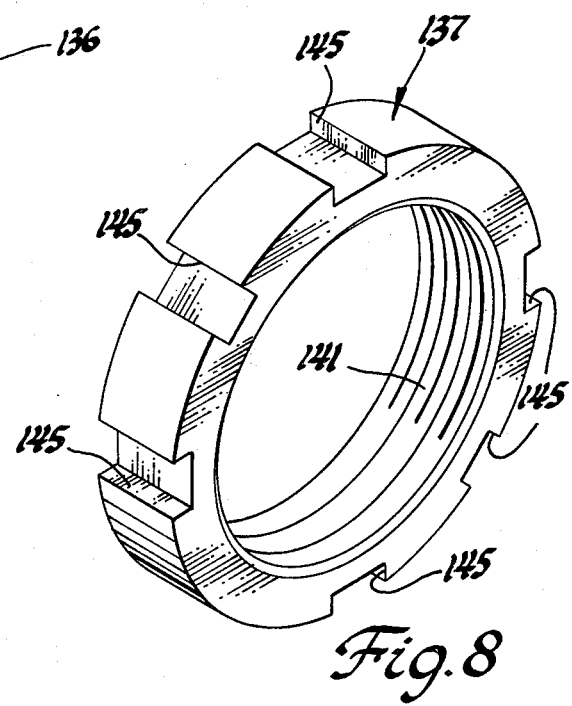
FIG. 8 is an elevational perspective view of a locking collar employed in the structure of FIG. 6.

As shown in FIG. 8, the collar 137 is provided with suitable wrench slots 145 in the outer periphery thereof for turning the locking ring 137 into a locking and jamming engagement with the outer face of the mounting flange 134.

It has been found that the shock absorber mounting means of the present invention is adapted to hold a shock absorber in an operative position without any danger of damaging the mounting threads 15 on the shock absorber 10, and without being detached by vibrations during operation of the shock absorber.

As shown in FIG. 1, a bleed screw 138 is threadably mounted in a threaded bore 139 which is formed through the wall of the outer tube rear part 13. The bore 139 communicates with the accumulator chamber portion indicated by the bore 21 in the outer tube rear part 13. Before use, the fill plug 123 is removed and the shock absorber 10 is filled with a suitable hydraulic fluid through the fill bore 122. The bleed screw 138 is operated to bleed off any air bubbles in the accumulator chamber.

It will be seen that the aforedescribed shock absorber structure provides an improved structure which overcomes the aforecited disadvantages of the prior art structures. It will be seen that a structure of the present shock absorber is a compact structure and it can be quickly and easily disassembled from one end of the outer tube for quick and easy repair of the shock absorber.

In the operation of the shock absorber 10, impact forces are received by the button 74 which causes the piston 56 and the piston rod 57 to move inwardly, or to the left as viewed in FIG. 1, within the piston cylinder 55 in the inner tube 36.

The inward movement of the piston 56 builds up pressure in the hydraulic fluid within the cylinder 55, which action causes the floating piston ring 130 to move against the back surface of the peripheral slot 129, to the position shown in FIG. 1, to seal the flow of fluid past the piston ring 130. During inward movement of the piston 56, hydraulic fluid is forced outwardly of the piston cylinder 55 through the metering holes or orifices 118 in the inner tube 36, and thence through the metering slots 117 in the metering tube 42, and into the accumulator chamber formed by the bores 19, 21 and 63. The cellular material 120 is compressed to compensate for the fluid displaced by the piston 56 and the rod 57 during the inward stroke of the piston 56.

As the piston 56 moves past each of the metering holes or orifices 118 in the inner tube 36, there is a reduction in a number of orifices 118 and a reduction in the total effective area of the orifices through which fluid can be displaced from the piston cylinder or chamber 55 in the inner tube 36. At the beginning of an inward stroke of the piston rod 57, the total effective area of the orifices 118 available for fluid displacement is at a maximum, while at the end of the stroke, when the piston 56 is moved inwardly past all of the orifices 118, the total effective area of the orifices 118 available for fluid displacement is zero. The orifices 118 are of uniform diameter and are axially spaced apart exponentially so that the total effective area available for fluid displacement decreases exponentially with the inward stroke of the piston 56. When the impact force is removed from the bumper or button 74, the spring 72 returns the piston rod 57 and the piston 56 to the normal or initial starting position shown in FIG. 1. During such outward or return movement of the piston 56, the floating piston ring 130 moves to the left of the position shown in FIG. 1 against the flange 127 to allow a free flow of hydraulic fluid through the return passages from the accumulator chamber into the piston cylinder 55. That is, the fluid is allowed to flow from the accumulator chamber formed by the bores 19, 21 and 63, around the wave washer 43 and through the passage between the rear end 66 of the bearing and seal assembly body 60 and the front ends 51 and 52 of the inner tube 36 and the metering tube 42, respectively, and past the floating ring 130 and through the holes 128 in the flange 127, and into the piston cylinder 55. The piston cylinder 55 is thus again filled with hydraulic fluid which puts the shock absorber in a condition to receive another impact load.

The rate at which impact loads are decelerated by the shock absorber 10 is a function of the rate at which the fluid is displaced through the metering orifices 118, which in turn is a function of the effective area of the orifices 118. The effective area of each orifice 118 may be varied differently within the range of the device and uniformly by rotatably adjusting the position of the metering tube 42 by rotating the adjusting ring 99. It will be seen that as the adjusting ring 99 is rotated, the metering slots 117 are moved over to the adjacent orifices 118 to open or close the orifices 118 in accordance with the direction of rotation of the adjusting ring 99. The shock absorber 10 of the present invention provides linear deceleration.

It will be seen that the threaded ends 15 and 32 of the shock absorber 10 permit the shock absorber 10 to be mounted in an operative position and fixed in place by either a front mounting position or a rear mounting position. It will also be seen that the shock absorber 10 of the present invention may be quickly and easily disassembled for repair since all of the internal working parts may be quickly removed, by removing the retaining ring 69 and the adjusting ring screw 100, and pulling out the bearing and seal retainer 58, the piston 56 and the rod 57, and the inner and outer tubes 36 and 42. After repairing the shock absorber, all of the internal parts may again be quickly mounted inside of the outer tube comprising the parts 12 and 13 from the front end thereof, and quickly locked in place by inserting the retainer ring 69 back in its retaining position, as shown in FIG. 1. The shock absorber 10 of the present invention employs fewer pieces than the prior art shock absorbers, and it is more economical to manufacture, yet it is capable of high energy impact absorption.

While it will be apparent that the preferred embodiment of the invention herein disclosed is well calculated to achieve the results aforestated, it will be appreciated that the invention is susceptible to modification, variation and change.

What is claimed is:

1. A shock absorber comprising:
   (a) an outer tube which is enclosed at one end and open at the other end;
   (b) an inner tube mounted in the outer tube, through the open other end of the outer tube, and having an enclosed inner end disposed against the enclosed end of the outer tube and being open at its outer end;
   (c) a piston assembly extended into the outer tube open end and being slidably mounted in the open outer end of the inner tube;
   (d) said piston assembly including a piston rod having an impact receiving button on the outer end thereof for receiving loads to be decelerated;
   (e) an accumulator chamber formed interior of said outer tube and between said inner tube and outer tube;
   (f) a plurality of longitudinally spaced metering orifices forming through said inner tube and communicating said inner tube with said chamber;
   (g) a meter tube rotatably mounted in said outer tube and about said inner tube engageable with the inner tube for retaining it against axial movement in the outer tube, and provided with a plurality of metering openings for regulating the flow of fluid through said metering orifices in the inner tube during a load deceleration operation;
   (h) an inner tube lock member mounted in said enclosed end of the outer tube and engageable with the inner tube for retaining the inner tube against rotation in the outer tube;
   (i) a rotatable retainer member detachably mounted in said open other end of the outer tube and having said piston rod slidably mounted therethrough;
   (j) a meter tube adjusting ring rotatably mounted about the outer periphery of said outer tube;
   (k) means extended through said outer tube for connecting said adjusting ring to said rotatable retainer member in said outer tube;
   (l) means mounted between the rotatable retainer member and said meter tube for axially retaining the meter tube in its operative position;
   (m) fluid passageway means interconnecting said accumulator chamber and the open end of said inner tube; and,
   (n) means in said outer tube for admitting hydraulic fluid into said accumulator chamber, fluid passageway means and inner tube, whereby when the piston assembly is moved inwardly of said inner tube, when an impact load is received by said piston assembly, the fluid in the inner tube is forced through the metering orifices in the inner tube and through the metering holes in the meter tube and into said accumulator chamber and through said fluid passageway means and into the open end of the inner tube behind the piston assembly, and when the piston assembly is moved outwardly of said inner tube after said impact load is decelerated, the fluid in the open end of the inner tube is forced from the open end of the inner tube and back through the fluid passageway means and through the accumulator chamber and through said metering holes and orifices and into the inner tube in front of the piston assembly.

2. A shock absorber as defined in claim 1, wherein:
   (a) each of said metering orifices in said inner tube comprises a round hole.

3. A shock absorber as defined in claim 2, wherein:
   (a) each of said plurality of metering openings in said metering tube are transverse metering slots.

4. A shock absorber as defined in claim 1, wherein:
   (a) said piston assembly includes a floating piston ring for blocking fluid flow through said fluid return passage means when said piston assembly is moved into said inner tube during a load decelerating operation.

5. A shock absorber as defined in claim 1, including:
   (a) a cellular material disposed in said chamber.

6. A shock absorber as defined in claim 5, including:
   (a) a deflector sleeve mounted in said outer tube between said cellular material and said meter tube.

7. A shock absorber as defined in claim 1, wherein:
   (a) said rotatable retainer member comprises a cylindrical member which carries a bearing member for said piston rod.

8. A shock absorber as defined in claim 7, wherein:
   (a) said member rotatably mounted in said other end of the outer tube includes a seal and wiper means for said piston rod.

9. A shock absorber as defined in claim 1, including:
   (a) a return spring means for moving the piston assembly outwardly of the inner tube back to its initial impact receiving position after a load decelerating operation.

10. A shock absorber as defined in claim 1, wherein:
    (a) said means for detachably connecting said rotatable retainer member with said rotatable meter tube includes a pin carried by said rotatable retainer member and having one end in driving engagement in a longitudinal slot formed in said rotatable meter tube.

11. A shock absorber as defined in claim 1, wherein:
    (a) said means mounted between the rotatable retainer member and said meter tube for axially returning the meter tube in its operative position comprises a wave washer means.

12. A shock absorber as defined in claim 1, wherein:
    (a) said outer tube is provided with mounting threads on the outer periphery thereof at each of its ends, for mounting a shock absorber in an operative position for receiving an impact load.

13. A shock absorber as defined in claim 12, including:
    (a) mounting means mounted on one of the threaded ends of said outer tube for operatively mounting the shock absorber on a mounting structure.

14. A shock absorber as defined in claim 13, wherein said mounting means includes:
    (a) a mounting flange for mounting on a support structure;

(b) means for securing the mounting flange on said support structure;
(c) said mounting flange having a threaded bore for threadably receiving said one externally threaded end of a shock absorber; and,
(d) a locking collar threadably mounted on said one threaded end of the shock absorber for jamming engagement with the mounting flange to lock the shock absorber in place.

* * * * *